United States Patent [19]
Chikatsu et al.

[11] 3,800,002
[45] Mar. 26, 1974

[54] PROCESS FOR PREVENTING THE POLYMERIZATION OF CONJUGATED DIENES

[75] Inventors: Tatsusuke Chikatsu; Yoshinori Yoshida; Shinichi Shimokawa; Toshio Akimoto, all of Yokkaichi, Japan

[73] Assignee: Japan Synthetic Rubber Company Limited, Tokyo, Japan

[22] Filed: Mar. 9, 1971

[21] Appl. No.: 122,514

[52] U.S. Cl.... 260/681.5 R, 260/666.5, 208/48 AA, 203/65, 203/9
[51] Int. Cl............................ C07c 7/00, C07c 7/18
[58] Field of Search ........ 260/666.5, 681.5; 208/48, 208/48 AA; 203/65, 9

[56] References Cited
UNITED STATES PATENTS

| | | | |
|---|---|---|---|
| 3,565,855 | 2/1971 | Meltsner | 260/45.85 |
| 3,567,682 | 3/1971 | Zaweski et al. | 260/45.85 |
| 3,558,470 | 1/1926 | Gillespie et al. | 208/48 |
| 3,265,751 | 8/1966 | McCoy et al. | 260/666.5 |
| 3,047,503 | 7/1962 | Jaffe et al. | 252/52 |
| 2,613,175 | 10/1952 | Johnstone et al. | 202/57 |
| 3,448,015 | 6/1969 | Rogers | 203/8 |
| 3,215,720 | 11/1965 | Atwood et al. | 260/461 |
| 3,340,160 | 9/1967 | Waldby | 203/9 |

Primary Examiner—Delbert E. Gantz
Assistant Examiner—Juanita M. Nelson
Attorney, Agent, or Firm—Toren and McGeady

[57] ABSTRACT

A process for preventing the polymerization of conjugated dienes in solvents at high temperatures comprising the addition of at least one compound selected from the group consisting of organic phosphoric acid esters of the specific general formula, pyridine, nuclear substituted derivatives of pyridine wherein the substituents are alkyl groups, quinoline, nuclear substituted derivatives of quinoline wherein the substituents are alkyl groups, and anthracene, to the solvent containing a conjugated diene as inhibitor.

11 Claims, No Drawings

PROCESS FOR PREVENTING THE POLYMERIZATION OF CONJUGATED DIENES

This invention relates to a process for preventing the polymerization of conjugated dienes and, more particularly, to a process for preventing the polymerization of conjugated dienes in organic solvents at relatively high temperature.

Processes for extractive distillation or absorption by solvent have been known for the separation and refining in high yield of high purity butadiene or isoprene, both industrially valuable materials, respectively from the $C_4$ hydrocarbon fraction of naphtha cracked oil which contains butadiene, butane, butylene and isobutylene as main components or from the $C_5$ hydrocarbon fraction which contains pentane, pentene, isoprene and piperylene as main components.

It is also known that for those processes solvents, such as acetonitrile (ACN), N-methyl pyrrolidone (NMP), dimethyl formamide (DMF), dimethyl acetamide (DMAC) and furfural, are used.

Usually the conjugated dienes above referred to are known to be readily oxidized at normal temperature by oxygen and the like present in the solutions and tend to produce polymers when allowed to stand for long. In the operation for separation and refining by a conventional extractive distillation or absorption process, solvents containing butadiene or isoprene are inevitably subjected to temperatures above the boiling point of the $C_4$ or $C_5$ hydrocarbon fractions, e.g., over 70° C. As a consequence, the polymerization of butadiene or isoprene in the solvent is accelerated and the polymerization product is deposited. This phenomenon is easily observed because the originally transparent solution is colored with time until it is opaque and a deposition of polymer occurs.

Such a polymer deposit causes various troubles. For example, it forms a thin polymer film over the inner walls of the equipment, clogs the passages, and reduces the extraction efficiency, thus making it practically difficult to operate the equipment continuously for many hours.

It is an object of the present invention to overcome the foregoing difficulties, that is, to prevent the polymerization of the conjugated dienes during the operation above described.

To achieve this object diversified studies have been made, and it has now been found that the polymerization of conjugated dienes can be effectively prevented by adding an organic phosphoric acid ester which may be represented as

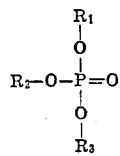

pyridine, quinoline, anthracene, a compound having an alkyl group in the nuclear substituent of pyridine, a compound having an alkyl group in the nuclear substituent of quinoline, etc. to a solvent, such as ACN, NMP, DMF or DMAC, for the extraction of a conjugated diene.

Thus, the present invention provides a process for preventing the polymerization of conjugated dienes in solvents at high temperature characterized by the addition of at least one compound selected from the class consisting of organic phosphoric acid esters of the general formula

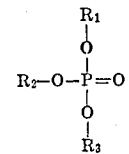

(wherein $R_1$, $R_2$ and $R_3$ are phenyl or nuclear substituted phenyl groups, the substituents being alkyl groups, phenyl group or halogen atoms, alkyl or halogenated alkyl groups or allyl group), pyridine, nuclear substituted derivatives of pyridine wherein the substituents are alkyl groups, quinoline, nuclear substituted derivatives of quinoline wherein the substituents are alkyl groups, and anthracene, to a solvent containing a conjugated diene.

Among the organic phosphoric acid esters which may be advantageously used for the invention are such compounds as triphenyl phosphate and nuclear substituted derivatives thereof wherein the substituents are alkyl groups, phenyl groups or halogen atoms, trialkyl phosphates with or without substitution of the hydrogen of the alkyl group by halogen atom, allylbiphenyl phosphate, diallylphenyl phosphate and other phenyl group- and allyl group- containing compounds.

Suitable triphenyl phosphate and nuclear substituted products thereof are triphenyl phosphate, tri(o-cresyl) phosphate, tri(m-cresyl) phosphate, tri(p-cresyl) phosphate, trixylenyl phosphate, tris(4-t-butylphenyl) phosphate, tris(o-biphenylyl) phosphate, etc. wherein the substituents are alkyl groups, phenyl groups or halogen atoms.

Suitable trialkyl phosphates and halogen substituted derivatives thereof are trimethyl phosphate, triethyl phosphate, tri-n-propyl phosphate, tri-iso-propyl phosphate, tri-n-butyl phosphate, tri-sec-butyl phosphate, tri-n-amyl phosphate, trihexyl phosphate, triheptyl phosphate, trioctyl phosphate and other organic phosphoric acid esters wherein the alkyl groups have from 1 to 8 carbon atoms; and tri(2-chloroethyl) phosphate, tri(2-bromoethyl) phosphate, tri(3-chloropropyl) phosphate, tri(3-bromopropyl) phosphate, tri(3-iodopropyl) phosphate, tri(2,3-dichloropropyl) phosphate, tri(2,3-dibromopropyl) phosphate, tri(2,3-diiodopropyl) phosphate, tri(4-chlorobutyl) phosphate, tri(4-bromobutyl) phosphate, tri(4-iodobutyl) phosphate and other organic phosphoric acid esters containing halogen atom-substituted alkyl groups. As the organic phosphoric acid esters which contain phenyl and allyl groups, diallylphenyl phosphate and allylbiphenyl phosphate are desirable.

Examples of the compounds having alkyl groups in the nuclear substituents of pyridine are: picolines, such as 2-methyl-pyridine, 3-methyl-pyridine and 4-methyl-pyridine; lutidines, such as 2,3-dimethyl pyridine, 2,4-dimethyl pyridine, 2-ethyl pyridine and 3-ethyl pyridine; collidines, such as 2-methyl-4-ethyl pyridine, 2-methyl-5-ethyl pyridine, 2-propyl pyridine, 2-isopropyl pyridine and 2,4,5-trimethyl pyridine; and parvolines, such as 2,3,4,5-tetramethyl pyridine and 2-butyl pyridine. Examples of compounds having alkyl groups substituted in the nuclear of quinoline are alkyl quinolines, such as 2-methyl quinoline, 3-methyl quinoline, 2,3-dimethyl quinoline, 3,4-dimethyl quinoline, 2-ethyl quinoline and 4-ethyl quinoline.

These polymerization inhibitors are capable of either preventing the polymerization of conjugated dienes at high temperature or permitting the chain transfer of polymerization thereby to avoid the production of any solvent-insoluble polymer. The above-mentioned organic phosphoric acid esters have particularly good polymerization-inhibiting effect.

Those polymerization inhibitors prove fairly effective when used singly. However, the effect of preventing the polymerization of conjugated dienes which is achieved by the addition of those compounds according to the present invention is much enhanced when the compounds are used in combination with an extensive variety of substances, e.g., sodium nitrite, potassium nitrite, sodium sulfide, phenolic compounds and aromatic amine compounds, which are usually employed as polymerization inhibitors or antioxidants for unsaturated compounds. This is because the polymerization inhibitors may be classified from the viewpoint of their mechanisms as such, into two types, i.e., radical chain reaction inhibitors and peroxide decomposing agents, and it is considered that the polymer production is based on the two stages of radical initiation and radical growth. Thus, the process of the invention makes it possible to promote the effect of preventing the polymerization of a conjugated diene in a solvent at elevated temperature remarkably by taking advantage of the synergistic action of the two substances which possess different polymerization inhibiting abilities. The combined use of the different inhibitors proves most beneficial for the prevention of polymerization of isoprene, especially.

The known polymerization inhibitors or antioxidants for unsaturated compounds used in combination with the inhibitors of the present invention include:

1. $NaNO_2$, $KNO_2$, $Na_2S$, methylene blue and mercaptobenzothiazole;
2. Phenolic compounds, e.g., hydroquinones, such as 2,5-di-tert.-butyl hydroquinone and 2,5-di-tert.-amyl hydroquinone; phenols, such as o-phenylphenol, 2,6-di-tert.-butyl-p-phenylphenol, butylated hydroxytoluene and p-methoxyphenol; cresols, such as 2,6-di-tert.-butyl-p-cresol; catechols, such as di-tert.-butyl catechol and p-tert.-butyl catechol; bisphenols, such as 2,2'-methylene-bis(4-methyl-6-tert.-butylphenol) and 4,4'-methylene-bis(2,6-di-tert.-butylphenol; naphthols, such as α-naphthol, β-naphthol, 1,1'-methylene-bis-2-naphthol; and aminophenols, such as p-aminophenol and 2,6-di-tert.-butyl-α-dimethyleneamine-p-cresol; and
3. Aromatic amine compounds, e.g., p,p'-diaminodiphenylmethane, N-phenyl-αnaphthylamine, N-phenyl-βnaphthylamine, p-isopropoxydiphenylamine, 4,4'-dimethoxydiphenylamine, N,N'-dipheny-p-phenylenediamine, N,N'-diphenylethylene diamine, N,N'-di-o-tolylethylenediamine, N,N'-di-β-Naphthyl-p-phenylene diamine, octyldiphenylamines (mono- and di-), and 2,4-diaminotoluene.

In accordance with the present invention, the effect of preventing the polymerization of butadiene and isoprene is adequately achieved even in the presence of iron rust which is generally believed contributory to cause the polymerization of dienes. This eliminates the use of expensive special steel as material of the equipment and makes possible steady, continuous operation for an extended period of time.

The amounts of the polymerization inhibitors to be added are varied according to the type and water content of the solvent and the operating conditions to be employed. Usually, however, the purpose is achieved by adding the first inhibitors, i.e., organic phosphoric acid esters, pyridine, quinoline, anthracene, the nuclear substituted derivatives of pyridine and quinoline, etc., in an amount of 0.01 to 10 percent, preferably 0.05 to 5 percent, by weight on the basis of the solvent, and adding the second inhibitors, i.e., sodium nitrite, phenolic compounds, aromatic amine compounds, etc., in an amount of 0.001 to 5 percent, preferably 0.005 to 1 percent, by weight on the basis of the solvent.

The said inhibitors classified into the two groups as above may be added singly or in combination, respectively, to attain the desired effect.

Of course, the amounts of these addition agents are not confined within the limits above specified.

The present invention is illustrated by the following examples.

Example 1

70 parts of dimethyl formamide containing 5 percent by weight of water and 30 parts of butadiene were mixed and, after the addition of the following inhibitors, the mixtures were treated with heat for 70 hours in the presence of iron rust at a temperature of 150° C and at a gauge pressure maintained at 5.0 kg/cm², and then the conditions of the products were investigated. Compositions free from water were treated under the same conditions. The results are shown in Table 1.

Example 2

Under the same conditions as described in Example 1 except that acetonitrile was used as the solvent, test solutions were prepared. With various inhibitors as given in Table 2, the preparations were treated with heat for 70 hours in the presence of iron rust at 120° C. The results were shown in Table 2.

Table 1

| No. | 1st inhibitors | Polymerization inhibitor (wt.%) | 2nd inhibitors | (ppm) | Condition after heat treatment | Polymer content (wt.%) |
|---|---|---|---|---|---|---|
| 1 | None | | None | | Polymer deposits | 8.0 |
| 2 | do. | | Sodium nitrite | 100 | Slightly whitens | 2.2 |

Table 1—Continued

| No. | 1st inhibitors | Polymerization inhibitor (wt.%) | 2nd inhibitors | (ppm) | Condition after heat treatment | Polymer content (wt.%) |
|---|---|---|---|---|---|---|
| 3 | Triphenyl phosphate | 0.5 | None | | do. | 1.7 |
| 4 | do. | 0.5 | Sodium nitrite | 100 | Clear | 0.3 |
| 5 | Triphenyl phosphate | 0.5 | Potassium nitrite | 100 | Clear | 0.5 |
| 6 | do. | 0.5 | Sodium sulfide | 100 | do. | 0.8 |
| 7 | do. | 0.5 | p-t-Butyl catechol | 100 | do. | 1.0 |
| 8 | do. | 1.0 | Phenyl-$\beta$-naphthylamine | 100 | do. | 1.2 |
| 9 | Tricresyl phosphate | 1.0 | None | | do. | 0.5 |
| 10 | do. | 0.5 | Sodium nitrite | 100 | do. | 0.4 |
| 11 | Di-n-butyl phosphate | 0.5 | do. | 100 | do. | 0.7 |
| 12 | Tri(n)butyl phosphate | 1.0 | None | | do. | 0.8 |
| 13 | Tris(4-t-butylphenyl phosphate) | 0.5 | Sodium nitrite | 100 | do. | 0.3 |
| 14 | Tris(o-biphenylyl) phosphate | 0.5 | do. | 100 | do. | 1.0 |
| 15 | Diallyl-phenyl phosphate | 0.5 | do. | 100 | do. | 1.2 |
| 16 | Tri-n-butyl phosphate | 1.0 | p-t-Butyl catechol | 100 | do. | 0.2 |
| 17 | Tricresyl phosphate | 0.5 | Sodium nitrite | 50 | do. | 0.8 |
| 18* | — | | do. | 100 | Polymer deposits | 6.3 |
| 19* | Triphenyl phosphate | 0.5 | do. | 100 | Clear | 0.8 |
| 20* | Tricresyl phosphate | 0.5 | do. | 100 | do. | 1.0 |

*Solvent (dimethyl formamide) completely free from water.

Table 2

| No. | 1st inhibitors | Polymerization inhibitor (wt.%) | 2nd inhibitors | (ppm) | Condition after heat treatment | Polymer content (wt.%) |
|---|---|---|---|---|---|---|
| 1 | None | | None | | Whitens & polymer deposits | 12.0 |
| 2 | do. | | Sodium nitrite | 100 | Slightly whitens | 1.9 |
| 3 | Tricresyl phosphate | 1.0 | None | | Clear | 0.9 |
| 4 | do. | 0.5 | Sodium nitrite | 100 | do. | 0.3 |
| 5 | Tri-n-butyl phosphate | 1.0 | None | | do. | 0.7 |
| 6 | do. | 0.5 | p-t-Butyl catechol | 200 | Lightly yellow | 1.1 |
| 7 | do. | 0.5 | Sodium nitrite | 100 | Clear | 0.1 |
| 8 | Triphenyl phosphate | 0.5 | do. | 50 | do. | 0.2 |
| 9 | Tri(2-chloroethyl) phosphate | 0.5 | do. | 50 | do. | 0.4 |

Further experiments were conducted under the same conditions as described above except that the solvent acetonitrile was replaced by N-methyl pyrrolidone or dimethyl acetamide. In either case, the addition of sodium nitrite (100 ppm) alone led to deposition of a polymer in 70 hours. However, there occurred no such polymer deposition and the solution remained clear when sodium nitrite (100 ppm) was added together with tricresyl phosphate (0.5 wt. percent).

Example 3

70 parts of acetonitrile which contained 5 percent by weight of water was mixed with a $C_4$ hydrocarbon fraction of the composition given in Table 3. With different inhibitors, each of the resulting mixtures was treated with heat for 70 hours in the presence of iron rust in a hermetically sealed vessel at a temperature of 120°C and a gauge pressure of 5 kg/cm². The results obtained were as shown in Table 4.

Table 3

| Component | Content(wt.%) |
|---|---|
| Allene | 0.002 |

Table 3-Continued

| Component | Content(wt.%) |
|---|---|
| Methyl acetylene | 0.019 |
| Isobutane | 2.605 |
| Isobutene | 32.755 |
| 1-Butene | 22.096 |
| 1,3-Butadiene | 33.847 |
| n-Butane | 2.400 |
| Trans-2-butene | 4.541 |
| Cis-2-butene | 1.690 |
| Vinyl acetylene | 0.041 |
| Ethyl acetylene | 0.003 |
| 1,2-Butadiene | 0.001 |
| | 100.000 |

Example 4

80 parts of acetonitrile which contained 5 percent by weight of water and 20 parts of butadiene were charged into a hermetically sealed vessel. With different inhibitors, the resulting mixtures were treated with heat for 70 hours in the presence of iron rust at a temperature of 120° C and a gauge pressure of 5 kg/cm². The results are given in Table 5.

Experiments were also conducted under the same conditions as above except that the solvent acetonitrile was replaced by DMF, NMP or DMAC. In every case, the addition of sodium nitrite (100 ppm) alone resulted

Table 4

| No. | 1st inhibitors | Polymerization inhibitor (wt.%) | 2nd inhibitors | (ppm) | Condition after heat treatment | Polymer content (wt.%) |
|---|---|---|---|---|---|---|
| 1 | None | | None | | Polymer deposits | 10.6 |
| 2 | do. | | Sodium nitrite | 100 | Slightly whitens | 4.2 |
| 3 | do. | | p-t-Butyl catechol | 100 | Whitens | 7.3 |
| 4 | Triphenyl phosphate | 0.5 | None | | Slightly whitens | 1.5 |
| 5 | do. | 0.5 | p-t-Butyl catechol | 100 | Clear | 1.0 |
| 6 | Tricresyl phosphate | 0.5 | Sodium nitrite | 100 | do. | 0.2 |
| 7 | Tri-n-butyl phosphate | 1.0 | None | | do. | 0.7 |
| 8 | Pyridine | 1.0 | Sodium nitrite | 100 | do. | 0.5 |
| 9 | Quinoline | 1.0 | do. | 100 | do. | 1.2 |
| 10 | Anthracene | 1.0 | do. | 100 | do. | 0.5 |

Table 5

| No. | 1st inhibitors | Polymerization inhibitor (wt.%) | 2nd inhibitors | (ppm) | Condition after heat treatment | Polymer Content (wt.%) |
|---|---|---|---|---|---|---|
| 1 | None | | None | | Whitens polymer deposits | 10.4 |
| 2 | do. | | Sodium nitrite | 200 | Slightly whitens | 3.2 |
| 3 | do. | | p-t-Butyl catechol | 200 | do. | 4.1 |
| 4 | Pyridine | 0.5 | None | | do. | 2.2 |
| 5 | do. | 0.5 | Sodium nitrite | 200 | Clear | 0.7 |
| 6 | do. | 1.0 | p-t-Butyl catechol | 200 | do. | 0.8 |
| 7 | α-Picoline | 1.0 | Sodium nitrite | 100 | do. | 0.5 |
| 8 | 2-Methyl-5-ethylpyridine | 1.0 | do. | 100 | do. | 0.4 |
| 9 | Quinoline | 0.5 | None | | Rather whitens | 1.7 |
| 10 | do. | 0.5 | Sodium nitrite | 100 | Clear | 0.1 |
| 11 | do. | 1.0 | p-t-Butyl catechol | 200 | do. | 0.4 |
| 12 | 2-Methyl quinoline | 1.0 | Sodium nitrite | 100 | do. | 0.8 |
| 13 | Anthracene | 0.5 | None | | Slightly whitens | 1.5 |
| 14 | do. | 1.0 | Sodium nitrite | 100 | Clear | 1.0 | in whitening of the solution in 70 hours, whereas the singular use of pyridine, quinoline or anthracene (0.5 wt. percent) kept the solutions clear 70 hours later. The transparency of the solutions was maintained for even longer periods by the combined use of sodium nitrite (100 ppm) and one of those inhibitors.

The results of Examples 1 to 4 given above demonstrate the effect achieved in accordance with the present invention for the prevention of polymerization of butadiene at elevated temperature.

Example 5

70 parts of acetonitrile which contained 5 percent by weight of water and 30 parts of isoprene were mixed with one of the various inhibitors mentioned below, and the resulting mixtures were treated with heat at 120° C, in the presence of iron rust. The conditions of the products were examined, the results being as compiled in Table 6.

of 7 to 1 of said $C_5$ hydrocarbon fraction. The mixture was continuously fed to the tenth stage from the column top, and the column was operated at a reflux ratio of 5.0, a column top temperature of 47° C and a column bottom temperature of 100° C. The isoprene-containing extracting solution was continuously treated at the next stripping column, and the recovered extractive solvent was directly recycled to the extractive distillation column.

The operation was continued for one week, but the extractive solution showed no sign of change and remained clear. When the same operation was repeated but without the addition of triphenyl phosphate and sodium nitrite to the extractive solvent, the solution began to become white and turbid in 10 hours and gave a polymer deposit lightly orange in color in 20 hours.

Example 7

Test solutions were prepared under the same condi-

Table 6

| No. | 1st inhibitors | Polymerization inhibitor (wt.%) | 2nd inhibitors | (ppm) | Condition after heating 24 hrs. | 80 hrs. |
|---|---|---|---|---|---|---|
| 1 | None | | None | | Polymer deposits | |
| 2 | do. | | Sodium nitrite | 100 | Slightly whitens | Polymer deposits |
| 3 | do. | | p-t-Butyl catechol | 100 | Polymer deposits | — |
| 4 | do. | | Phenyl-β-naphthylamine | 100 | Polymer deposits | — |
| 5 | Triphenyl phosphate | 0.5 | None | | Slightly whitens | Polymer deposits |
| 6 | do. | 0.5 | Sodium nitrite | 100 | Clear | Clear |
| 7 | do. | 0.5 | do. | 50 | do. | Slightly whitens |
| 8 | Triphenyl phosphate | 0.5 | p-t-Butyl catechol | 100 | Clear | Slightly whitens |
| 9 | do. | 1.0 | Phenyl-β-naphthylamine | 100 | Clear | do. |
| 10 | Tricresyl phosphate | 0.5 | Sodium nitrite | 100 | do. | Clear |
| 11 | Tris(4-t-butylphenyl) phosphate | 0.5 | do. | 100 | do. | do. |
| 12 | Tri(n)butyl phosphate | 0.5 | do. | 100 | do. | do. |
| 13 | Tris(o-biphenyl) phosphate | 0.5 | do. | 100 | do. | do. |
| 14 | Diallyl-phenyl phosphate | 0.5 | do. | 100 | do. | do. |

Example 6

Into an extractive distillation column having 100-stage plates, a $C_5$ hydrocarbon fraction containing isoprene was fed, using an extractive solvent prepared by adding 0.5 percent by weight of triphenyl phosphate and 100 ppm of sodium nitrite to acetonitrile containing 5 percent by weight of water, at a rate (molar ratio)

tions as described in Example 5 except that N-methyl pyrrolidone was employed as the solvent and, with different inhibitors tabled below, the respective solutions were treated in the presence of iron rust with heat at 140° C. The conditions of the solutions were investigated, and the results as given in Table 7 were obtained.

Table 7

| No. | 1st inhibitors | Polymerization inhibitor (wt.%) | 2nd inhibitors | (ppm) | Condition after heating 24 hrs. | 72 hrs. |
|---|---|---|---|---|---|---|
| 1 | None | | None | | Polymer deposits | — |
| 2 | do. | | Sodium nitrite | 100 | Slightly whitens | Polymer deposits |
| 3 | Triphenyl phosphate | 0.5 | None | | Slightly whitens | Polymer deposits |
| 4 | do. | 0.5 | Sodium nitrite | 100 | Clear | Clear |
| 5 | Tri(n)butyl phosphate | 0.5 | None | | Slightly whitens | Polymer deposits |
| 6 | do. | 0.5 | Sodium nitrite | 100 | Clear | Clear |

Similar experiments were conducted under the same conditions as above but using dimethyl formamide or dimethyl acetamide in place of N-methyl pyrrolidone as the solvent. In each case the use of sodium nitrite (100 ppm) alone led to deposition of polymer in 72 hours, but when sodium nitrite (100 ppm) and tri-n-butyl phosphate (0.5 wt. percent) were added, the test solution remained clear 72 hours later.

Example 8

70 parts of acetonitrile which contained 5 percent by weight of water and 30 parts of isoprene were mixed and, with the addition of various inhibitors tabled below, the respective mixtures were treated in the presence of iron rust at 120° C, and the conditions of the products were investigated. The results are given in Table 8.

hours, while, under the conditions corresponding to those for Exp. Nos. 5, 9 and 13, the extracting solutions were clear.

Example 9

Experiment was conducted under the same conditions as described in Example 6 except that 0.5 percent by weight of pyridine and 100 ppm of sodium nitrite were used as the inhibitors.

The operation was continued for 5 days, but the extracting solution showed no sign of change and remained clear. When pyridine was replaced by quinoline or anthracene, the results were similar to those attained with pyridine.

In the absence of pyridine, quinoline, anthracene or sodium nitrite, the extracting solution began to become white and turbid in 10 hours and deposited a lightly orange polymer in 20 hours.

Example 10

Table 8

| No. | 1st inhibitors | Polymerization inhibitor (wt.%) | 2nd inhibitors | (ppm) | Condition after heating 24 hrs. | 48 hrs. |
|---|---|---|---|---|---|---|
| 1 | None | | None | | Polymer deposits | |
| 2 | do. | | Sodium nitrite | 200 | Slightly whitens | Polymer deposits |
| 3 | do. | | p-t-Butyl catechol | 200 | Polymer deposits | — |
| 4 | Pyridine | 0.5 | None | | Rather turbid | Polymer deposits |
| 5 | do. | 0.5 | Sodium nitrite | 200 | Clear | Clear |
| 6 | do. | 1.0 | do. | 100 | do. | do. |
| 7 | do. | 1.0 | p-t-Butyl-catechol | 200 | Slightly whitens | Rather turbid |
| 8 | Quinoline | 0.5 | None | | Rather turbid | Polymer deposits |
| 9 | do. | 0.5 | Sodium nitrite | 200 | Clear | Clear |
| 10 | do. | 1.0 | do. | 100 | do. | do. |
| 11 | do. | 1.0 | p-t-Butyl catechol | 200 | Slightly whitens | Rather turbid |
| 12 | Anthracene | 0.5 | None | | Rather turbid | Polymer deposits |
| 13 | do. | 0.5 | Sodium nitrite | 200 | Clear | Clear |
| 14 | do. | 1.0 | do. | 100 | do. | do. |
| 15 | Anthracene | 1.0 | p-t-Butyl catechol | 200 | Slightly whitens | Rather turbid |

Experiments were conducted under the same conditions for Exp. Nos. 4, 5, 8, 9, 12 and 13 in Table 8 except that the solvent acetonitrile was replaced by N-methyl pyrrolidone or dimethyl formamide. Then, under the conditions corresponding to those for Exp. Nos. 4, 8 and 12, slight turbidity was observed in 24

Under the same conditions as used in Example 8, test solutions were prepared with the addition of various inhibitors mentioned in Table 9, and the mixtures were treated in the presence of iron rust at 120° C, and then the conditions of the products were examined. The results obtained were as shown in Table 9.

Table 9

| No. | 1st inhibitors | Polymerization inhibitor (wt.%) | 2nd inhibitors | (ppm) | Condition after heating 24 hrs. | 48 hrs. |
|---|---|---|---|---|---|---|
| 1 | 2-Methyl pyridine | 0.5 | None | | Rather turbid | Polymer deposits |
| 2 | do. | 0.5 | Sodium nitrite | 200 | Clear | Clear |
| 3 | do. | 1.0 | do. | 100 | do. | do. |
| 4 | do. | 1.0 | p-t-Butyl catechol | 200 | Slightly whitens | Rather turbid |
| 5 | 2,3-Dimethyl pyridine | 0.5 | None | | Rather turbid | Polymer deposits |
| 6 | do. | 0.5 | Sodium nitrite | 200 | Clear | Clear |
| 7 | do. | 1.0 | do. | 100 | do. | do. |
| 8 | do. | 1.0 | p-t-Butyl catechol | 200 | Slightly whitens | Rather turbid |
| 9 | 2-Methyl-4-ethyl pyridine | 0.5 | None | | Rather turbid | Polymer deposits |

Table 9 — Continued

| No. | 1st inhibitors | Polymerization inhibitor (wt.%) | 2nd inhibitors | (ppm) | Condition after heating 24 hrs. | 48 hrs. |
|---|---|---|---|---|---|---|
| 10 | do. | 0.5 | Sodium nitrite | 200 | Clear | Clear |
| 11 | do. | 1.0 | do. | 100 | do. | do. |
| 12 | do. | 1.0 | p-t-Butyl catechol | 200 | Slightly whitens | Rather turbid |
| 13 | 2-Methyl quinoline | 0.5 | None | | Rather turbid | Polymer deposits |
| 14 | do. | 0.5 | Sodium nitrite | 200 | Clear | Clear |
| 15 | do. | 1.0 | do. | 100 | do. | do. |
| 16 | do. | 1.0 | p-t-Butyl catechol | 200 | Slightly whitens | Rather turbid |
| 17 | 4-Ethyl quinoline | 0.5 | None | | Rather turbid | Polymer deposits |
| 18 | do. | 0.5 | Sodium nitrite | 200 | Clear | Clear |
| 19 | do. | 1.0 | do. | 100 | do. | do. |
| 20 | do. | 1.0 | p-t-Butyl catechol | 200 | Slightly whitens | Rather turbid |

We claim:

1. A process for preventing the polymerization of conjugated dienes in solvents at high temperature characterized by the addition of at least one compound selected from the group consisting of organic phosphoric acid esters of the general formula

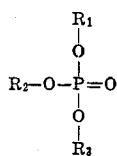

wherein $R_1$, $R_2$ and $R_3$ are phenyl group or nuclear substituted derivatives thereof whose substituents being alkyl groups, phenyl group or halogen atoms; alkyl groups; halogen substituted alkyl groups, or allyl group to the solvent containing the conjugated diene as a first inhibitor.

2. A process for preventing the polymerization of butadiene in a solvent at elevated temperature characterized by the addition of at least one compound selected from the group consisting of organic phosphoric acid esters of the general formula

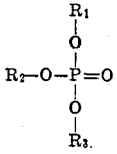

3. A process for preventing the polymerization of isoprene in a solvent at elevated temperature characterized by the addition of at least one compound selected from the group consisting of organic phosphoric acid esters of the general formula

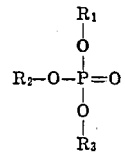

(wherein $R_1$, $R_2$ and $R_3$ are phenyl group or nuclear substituted derivatives thereof whose substituents being alkyl groups, phenyl group or halogen atoms; alkyl groups; halogen substituted alkyl groups, or allyl group), to the solvent containing isoprene as inhibitor.

4. A process for preventing the polymerization of conjugated dienes as defined in claim 1 wherein the organic phosphoric acid esters are triphenyl phosphate and nuclear substituted derivatives thereof wherein the substituents are alkyl groups, phenyl group or halogen atoms, trialkyl phosphates with or without substituted halogen atom, allylbiphenyl phosphate and diallylphenyl phosphate.

5. A process for preventing the polymerization of conjugated dienes as defined in claim 4 wherein the triphenyl phosphates and nuclear substituted derivatives thereof are triphenyl phosphate, tri(o-cresyl) phosphate, tri(m-cresyl) phosphate, tri(p-cresyl) phosphate, trixylenyl phosphate, tris(4-t-butylphenyl) phosphate, tris(o-biphenylyl) phosphate.

6. A process for preventing the polymerization of conjugated dienes as defined in claim 4 wherein the trialkyl phosphates and halogen substituted derivatives thereof are trimethyl phosphate, triethyl phosphate, tri(n)propyl phosphate, tri(i)propyl phosphate, tri(n)butyl phosphate, tri(sec)butyl phosphate, tri(n)amyl phosphate, trihexyl phosphate, triheptyl phosphate, trioctyl phosphate and other organic phosphoric acid esters wherein the alkyl groups have from 1 to 8 carbon atoms; and tri(2-chloroethyl) phosphate, tri(2-bromoethyl) phosphate, tri(3-chloropropyl) phosphate, tri(3-bromopropyl) phosphate, tri(3-iodopropyl) phosphate, tri(2,3-dichloropropyl) phosphate, tri(2,3-dibromopropyl) phosphate, tri(2,3-diiodopropyl) phosphate, tri(4-chlorobutyl) phosphate, tri(4-bromobutyl) phosphate, tri(4-iodobutyl) phosphate.

7. A process for preventing the polymerization of conjugated dienes as defined in claim 4 wherein the organic phosphoric acid esters which contain phenyl and allyl groups are diallylphenyl phosphate and allylbiphenyl phosphate.

8. The process of claim 1 wherein a known polymerization inhibitor or antioxidant for unsaturated compounds selected from the group consisting of sodium nitrite, potassium nitrite, sodium sulfide, a phenolic compound and an aromatic amine compound is used as a second polymerization inhibitor.

9. A process for preventing the polymerization of conjugated dienes as defined in claim 8 wherein the second polymerization inhibitor is sodium nitrite.

10. A process for preventing the polymerization of conjugated dienes in solvents at high temperature characterized by the addition of at least one compound selected from the group consisting of organic phosphoric acid esters of the general formula

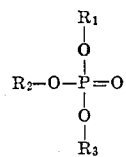

wherein $R_1$, $R_2$ and $R_3$ are phenyl group or nuclear substituted derivatives thereof whose substituents being alkyl groups, phenyl group or halogen atoms; alkyl groups; halogen substituted alkyl groups, or allyl group, to the solvent containing the conjugated diene as a first inhibitor, and wherein a known polymerization inhibitor or antioxidant for unsaturated compounds selected from the group consisting of sodium nitrite, potassium nitrite, sodium sulfide, a phenolic compound and an aromatic amine compound is used as a second polymerization inhibitor.

11. The process of claim 10 wherein the second polymerization inhibitor is sodium nitrite.

* * * * *

UNITED STATES PATENT OFFICE
CERTIFICATE OF CORRECTION

Patent No. 3,800,002          Dated March 26, 1974

Inventor(s) Tatsusuke Chikatsu et al

It is certified that error appears in the above-identified patent and that said Letters Patent are hereby corrected as shown below:

In the heading of the patent, insert

--[30]    Foreign Application Priority Data

March 20, 1970 Japan................45-23740
    July   9, 1970 Japan................45-60034
    Oct.   5, 1970 Japan................45-87366--

Signed and sealed this 12th day of November 1974.

(SEAL)
Attest:

McCOY M. GIBSON JR.                C. MARSHALL DANN
Attesting Officer                  Commissioner of Patents